United States Patent
McIntyre

(10) Patent No.: US 6,408,115 B1
(45) Date of Patent: Jun. 18, 2002

(54) MULTI-PORT OPTICAL COUPLING SYSTEM USING ANAMORPHIC LENSES TO CORRECT FOR ABERRATION

(76) Inventor: Kevin J. McIntyre, 160 Bedford St., Rochester, NY (US) 14609

( * ) Notice: Subject to any disclaimer, the term of this patent is extended or adjusted under 35 U.S.C. 154(b) by 243 days.

(21) Appl. No.: 09/586,440

(22) Filed: Jun. 2, 2000

(51) Int. Cl.[7] .................................................. G02B 6/26
(52) U.S. Cl. ............................. 385/33; 385/34; 385/37; 359/131
(58) Field of Search ............................. 385/31–37, 74, 385/93; 359/131

(56) References Cited

U.S. PATENT DOCUMENTS

| | | |
|---|---|---|
| 3,937,560 A | 2/1976 | Milton |
| 4,213,677 A | 7/1980 | Sugimoto |
| 4,834,485 A | 5/1989 | Lee |
| 4,961,622 A | 10/1990 | Gorman |
| 5,050,954 A | 9/1991 | Gardner |
| 5,054,877 A | 10/1991 | Ortiz |
| 5,293,269 A | 3/1994 | Burkhart |
| 5,657,155 A | 8/1997 | Cheng |
| 5,761,354 A | 6/1998 | Kuwano |
| 5,963,359 A | 10/1999 | Sinazake |
| 6,034,825 A * | 3/2000 | Konishi et al. .............. 359/654 |
| 6,349,159 B1 * | 2/2002 | Uebbing et al. .............. 385/33 |

* cited by examiner

Primary Examiner—Hemang Sanghavi

(57) ABSTRACT

In order to correct optical couplers, which couple light among optical fibers arranged at an input (light source) port and output ports which are spaced off the optical axis of the coupler for optical aberration, including astigmatic aberration, anamorphic lenses are used in the coupler instead of lenses with rotationally symmetric surfaces. The anamorphic lenses may be collimating and decollimating lenses arranged along an optical axis on opposite sides of a wave length beam splitting filter which reflects and transmits different portions of the source spectrum. These lenses are anamorphic lenses with toroidal surfaces instead of rotationally symmetric surfaces, as in such couplers of conventional design. The wave front error and the insertion loss of the coupler is substantially reduced providing a substantial improvement in coupling efficiency and in coupling system performance.

17 Claims, 5 Drawing Sheets

MULTI-PORT OPTICAL COUPLING SYSTEM USING ANAMORPHIC LENSES TO CORRECT FOR ABERRATION

DESCRIPTION

The present invention relates to optical couplers and especially to optical couplers adapted for coupling optical fibers and providing wavelength division mutliplexing of light to a plurality of fibers which are coupled, via the optical coupler, to a source of broad band light.

Optical couplers, in accordance with the invention, are designed using lenses having anamorphic surfaces which handle light between input and output ports which are offset from the optical axis of the coupler and to reduce optical aberrations in the light reaching the output ports such that the efficiency of the coupler is enhanced the efficiency of the coupler may be a multiplicity of times better than that of couplers of conventional design having lenses with rotationally symmetric surfaces, even when such surfaces are aspherically corrected. The surfaces of the lenses in the improved coupler are preferably toroidal.

Conventional fiber optic couplers providing off axis coupling, that is from ports which are spaced from the optical axis and having wavelength division multiplexing beam splitters or filters, have used lenses which rotationally symmetric surfaces or gradient index lenses. U.S. Pat. No. 3,973,560 issued to A. Milton and U.S. Pat. No. 4,213,677 issued to S. Sugimoto et al, show the general design of such optical couplers with lenses having rotationally symmetric refracting surfaces. Such lenses have introduced aberrations and distortion of the light passing via the lenses to output ports of the coupler, thereby causing the coupler to introduce undesirable values of insertion loss. This has led to the adoption of gradient index lenses which are tolerant of off axis location of the ports even at relatively wide separations, say around 200 to 300 microns (micrometers). Since the index of refraction of the gradient index lens material is different from the silica material of the optical fibers, it is difficult to closely couple, say by fusion bonding, the fibers to the gradient index lenses of the coupler without introducing undesirable reflection which can deteriorate the insertion loss presented by the coupler and cause a high level of back reflection into the fiber.

The present invention provides a coupler using non-gradient index lenses which may be made of the same material as the optical fibers but having insertion loss comparable to couplers with gradient index lenses.

Accordingly, it is the principal object of the invention to provide improved optical couplers, especially suitable for fiber coupling, and having insertion loss better than couplers using non-gradient index lenses of conventional design.

It is a further object of the invention to provide an improved fiber optic coupling system where the fibers associated with the coupler are spaced from the optical axis of the coupler, even by hundreds of microns, and without adversely affecting the coupling efficiency, by minimizing the insertion loss introduced by the coupler.

It is a still further object of the invention to provide an improved optical coupler especially suitable for fiber optic coupling applications, which also provides wavelength division multiplexing and couples light among the ports efficiency by minimizing insertion loss due to the coupler.

It is a still further object of the present invention to provide an improved optical coupler having more than two output ports, as with an input port and two output ports on one side of the coupler and an output port on the opposite side of the coupler.

Briefly described, a system for coupling an input port providing a light source to a plurality of output ports, with the input and output ports being fiber optic ends, in accordance with the invention uses a pair of lenses which are arranged in collimating and decollimating relationship to provide light paths from the source port to the output ports. An element, such as a wavelength beam splitter as may be provided by an interference filter via which light collimated by one of the lenses passes and which divides the light into a plurality of paths to the output port, is disposed between the collimating and decollimating lenses. At least one of the lenses has a rotationally asymmetric (preferably toroidal surface) which provides for correction of aberrations in the light reaching the output ports. By virtue of the asymmetric surface, the wavelength distortion and consequent insertion loss is much better than with conventional fiber optic couplers.

The foregoing and other objects, features and advantages of the invention as well as presently preferred embodiments thereof, will become more apparent from a reading of the following description in connection with the accompanying drawings in which.

Figure 1:
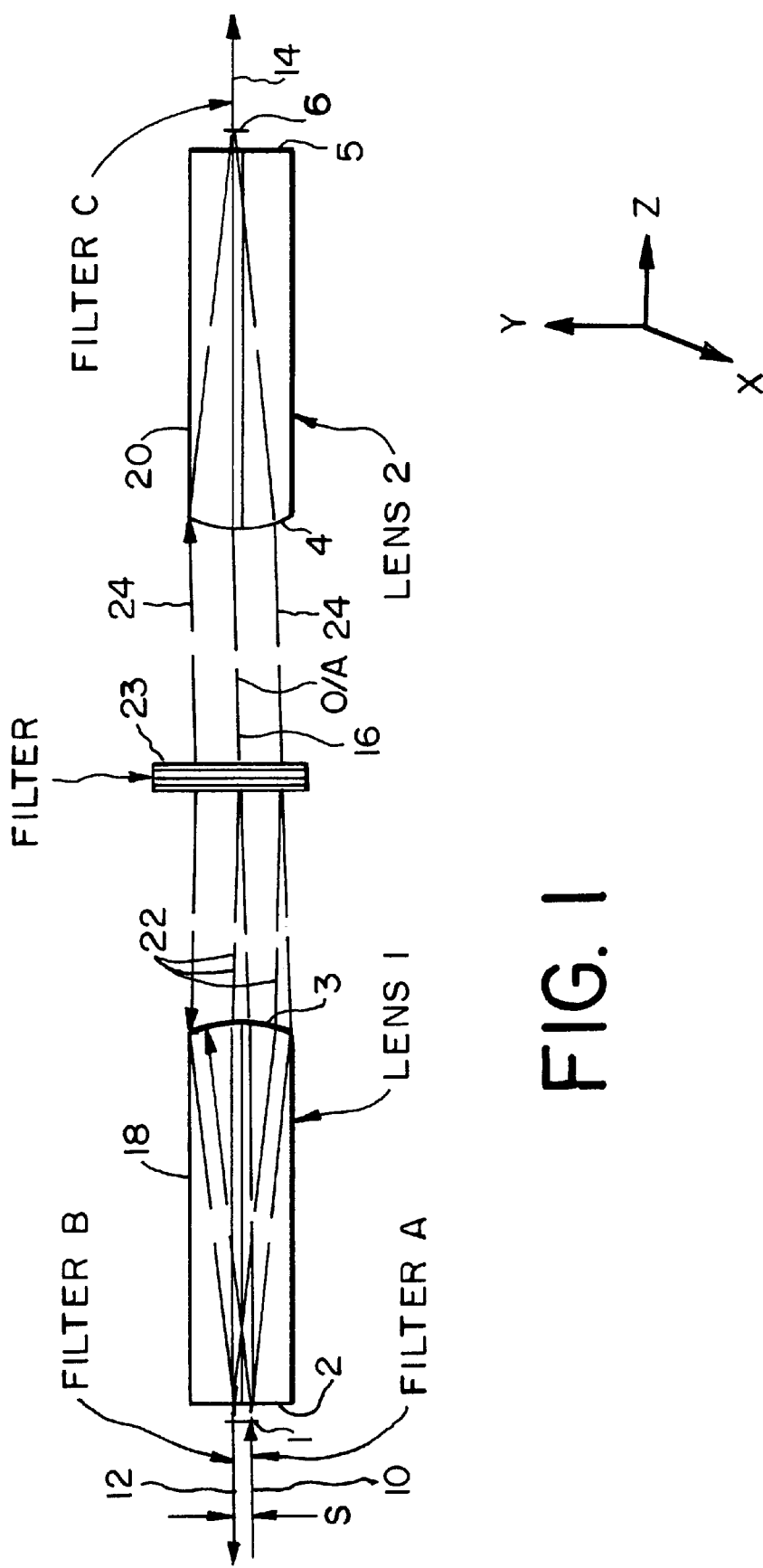
FIG. 1 is a schematic view illustrating a three-port coupling system which couples light between an input fiber and two output fibers having the ends thereof at input and output ports of the coupling system, the view is taken from the side of the system.
Figure 3A:
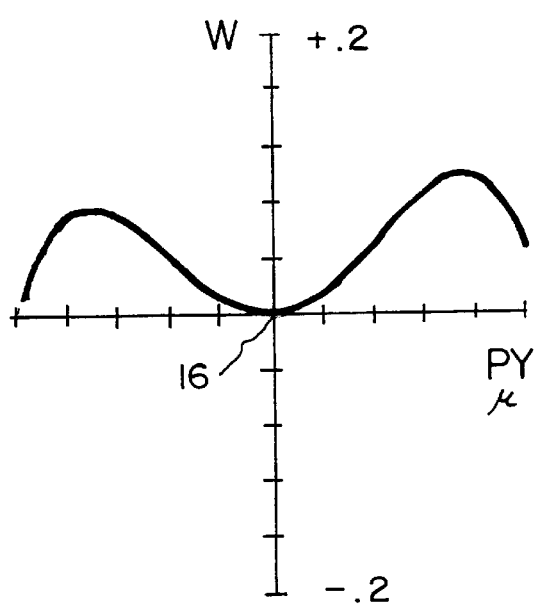
Figure 3B:
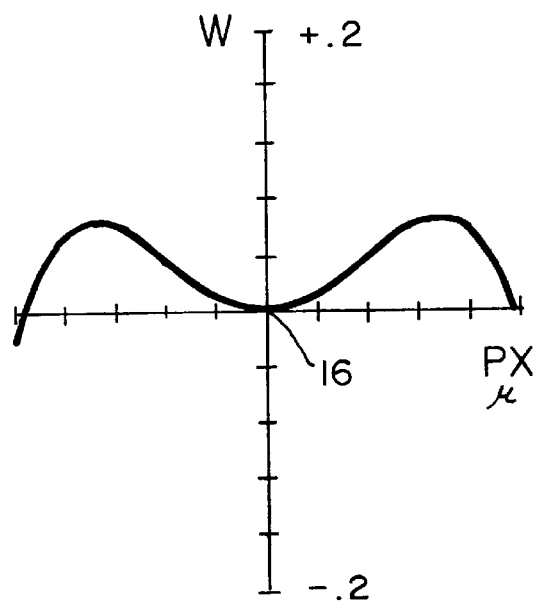
Figure 4A:
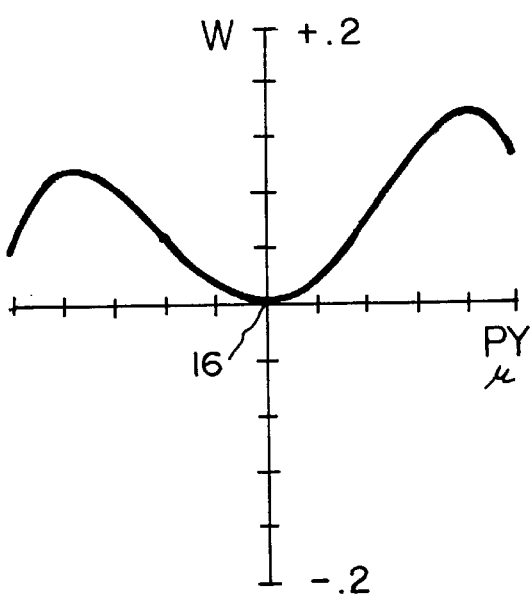
Figure 4B:
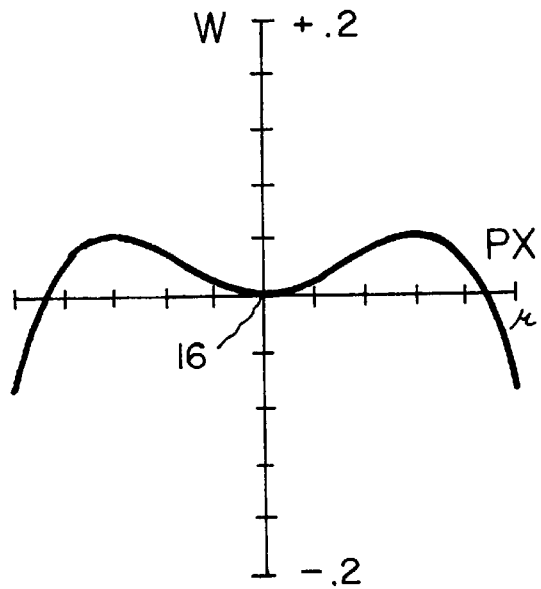
Figure 5A:
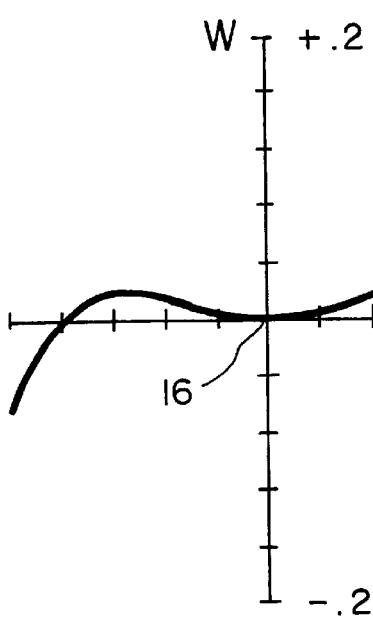
Figure 5B:
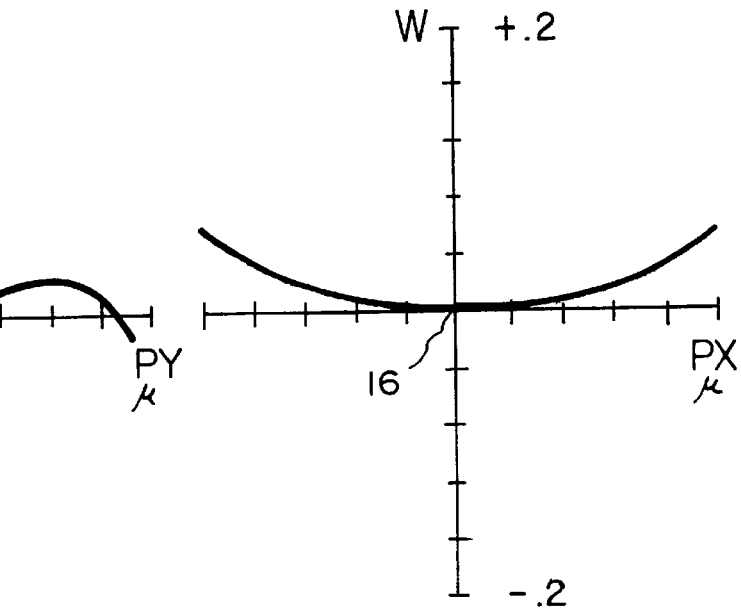
Figure 6A:
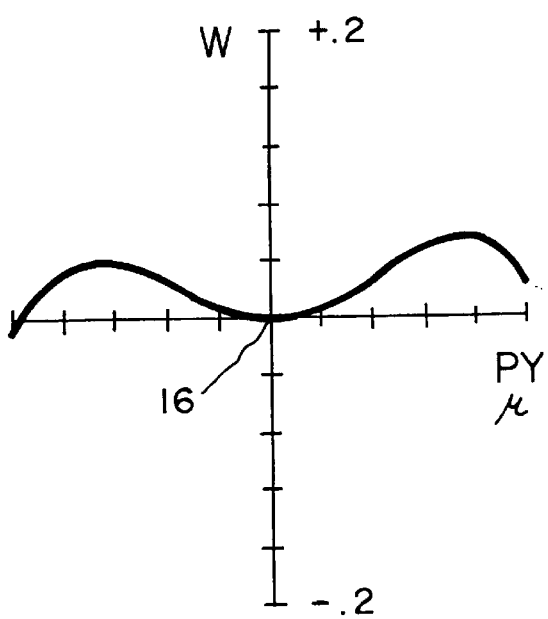
Figure 6B:
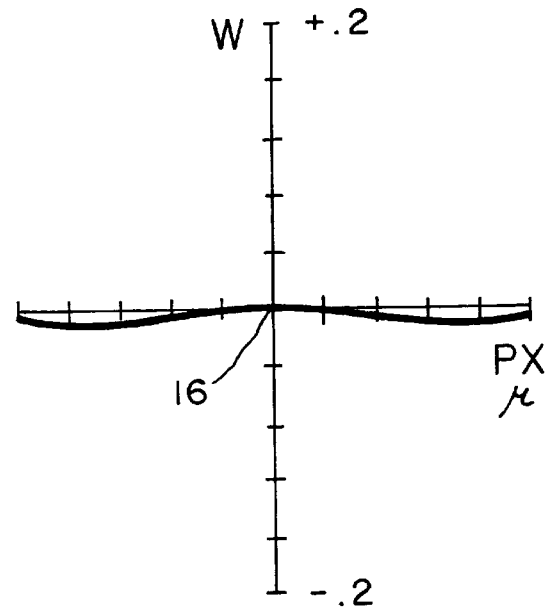
Figure 7:
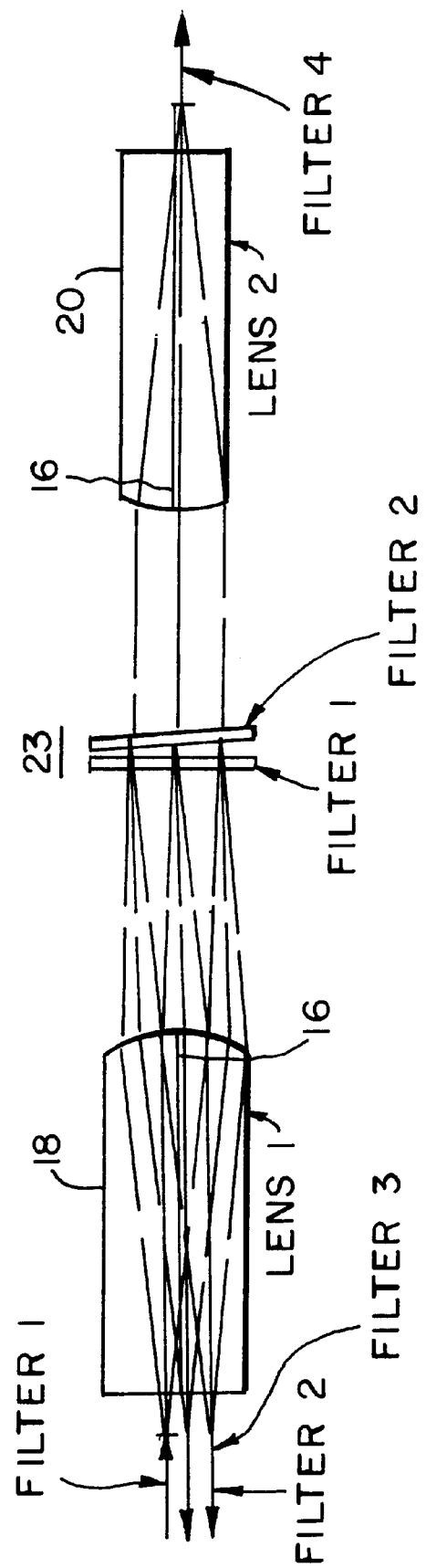

FIGS. 3A and 3B are curves for a coupler system of conventional design showing the optical path difference and therefore the wavefront errors which is related to the insertion loss at the output ports in the tangential (or y-z plane and in sagittal (x-z plane, respectfully, where the fibers at the input and on output port of the coupler, which faces one end of the collimating lens are separated by 125 microns, divided equally along a diameter through the optical axis;

FIGS. 4A and 4B are curves similar to those shown in FIGS. 3A and 3B for a coupler of conventional design with the input and one of the output fibers separated by 240 microns;

FIGS. 5A and 5B are curves similar to those shown in FIGS. 3A and 3B but utilizing toroidal anamorphic collimating and decollimating lenses, in accordance with the invention;

FIGS. 6A and 6B are curves similar to those shown in FIGS. 4A and 4B for a coupler in accordance with the invention where the off-optical axis fibers are separated by 240 microns;

FIG. 7 is a optical schematic diagram similar to FIG. 1, of a coupler system having an input port and four output ports, the output ports each receiving a beam containing a different wavelength division multiplexed portion of the spectrum of the light from the input port, thereby illustrating that more than two output ports may be provided while maintaining the efficiency of the coupler (with minimized insertion loss), and reducing the number of couplers required to be arranged in a cascaded array of couplers for wavelength division multiplexing into a desired number of channels.

Figure 2:
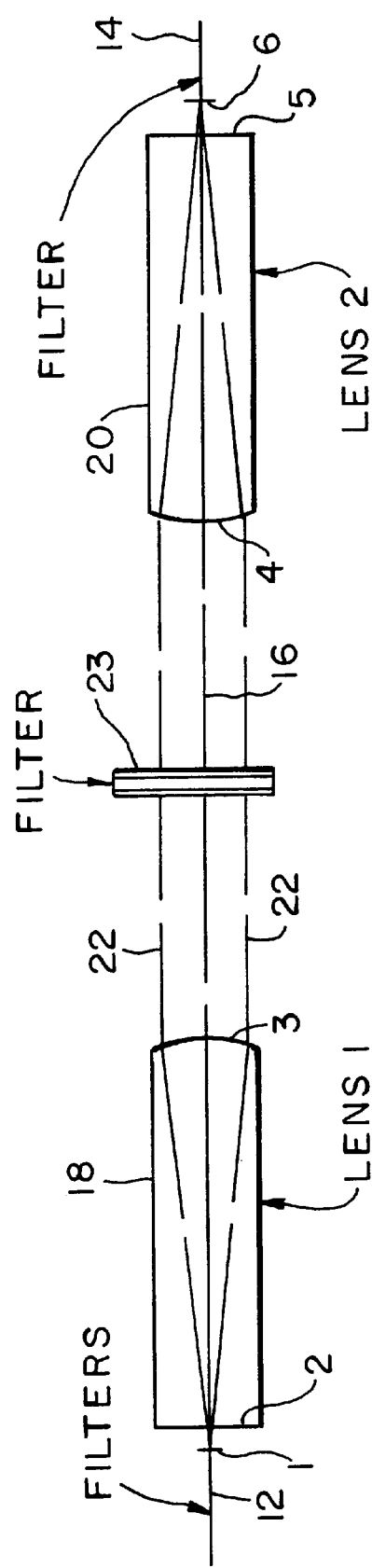
FIG. 2 is a view similar to FIG. 1, but taken from the top of the system.

Referring more particularly to FIGS. 1 and 2, there is shown an optical layout (a schematic view) of a coupler system embodying the invention. An input port is provided at the end of an input optical fiber 10. This fiber may be a commercially available optical fiber of silica material. Output ports are at the ends of two other optical fibers 12 and 14. All of the ports and the center of the optical fiber ends are spaced radially offset from the optical axis 16 of the coupler system. The ends of the fibers 10 and 12 may be in the same plane indicated at 1 facing and spaced from the plano end of a plano convex collimating lens 18. This lens may be made of the same material as the optical fibers 10, 12 and 14, namely silica, so as to enable the ends of the fibers to be attached directly to the plano ends of the lens 18. Epoxy or glue of optical quality may be used to adhere the fiber ends to the piano surface of the lens 18. Or the ends may be fusion bonded, which may be readily accomplished, since the material of the fibers and the lens are substantially the same. Because the materials of the fiber and the lens are the same, their index of refraction is equal and reflections at the interface are minimized. In the event that there is an air gap between the ends of the fiber and the lens, the ends may be cut at a non-normal angle with respect to the optical axis, which may be preferable to reduced back reflections into the fibers. A typical angle to the axis is 8 degrees. The plano back of the lens then may have a slanted surface to compensate for the non-zero cleve angle.

The collimating lens 18, as well as the decollimating lens 20 of the system, may be made from a slab of silica having a planar surface by coating the surface with photoresist and then writing a circular patterns of density which increases radially inward to a point which then defines the apex of the convex surface of the lens.

The planar surface in which the ends of the fibers 10 and 2 are located is indicated at surface 1. Surface 2 is the piano surface of the lens 18. Surface 3 is the concave surface of the lens 18. Surface 4 is the convex surface of the decollimating lens 20. 5 is the piano surface of the decollimating lens. 6 is the surface of the end of the output fiber 14 at one of the output ports of the coupler. Between the concave surfaces 3 and 4 of the collimating and decollimating lenses, which are lenses in collimating and decollimating relationship, is a beam splitting wavelength division multiplexing filter. This filter may be of conventional design for reflecting a desired channel of the broad band spectrum (the light source) provided by the input fiber 10 less a portion of the spectrum which is reflected along the path, indicated by the lines 22, through the collimating lens, now acting as a decollimating lens, to the output port at the end of the output fiber 12. The path of the broad spectrum light is indicated by the lines 24 parallel to the optical axis. Light along this path 24 is decollimated in the lens 20 and focused at the output port provided by the end of the fiber 14. The distance between the ends of the fibers 10, 12 and 14 and the plano surfaces of the lenses may be adjusted to ensure focusing of the light at the output ports.

For the design of an interference filter suitable for use as a beam splitting filter 23, see the text "Applied Optics", A Guide to Optical Systems Design, Volume 2, by Leo Levi, published by John Wiley & Sons, 1980, pages 40 to 49.

The lenses 18 and 20 may be identical and each has a rotationally asymmetric surface which is a toroidal surface, as its convex surface 3 and 4. As shown by the contrast between the wavefront error curves in FIGS. 3A and 3B and FIGS. 4A and 4B of a coupler with a rotationally symmetric and aspherically corrected refracting surface, with the curves of FIGS. 5A and 5B and 6A and 6B which show the waveform error introduced by lenses having toroidal surfaces, it is demonstrated, quite surprisingly, that the waveform error is reduced and the insertion loss is reduced approximately by a factor of 4 over the insertion loss of the coupler system with conventional rotationally symmetric, aspherically corrected lenses.

In the curves (FIGS. 3A to 6B), the horizontal axis is normalized to the full width of the beam at the output ports. The beam may be truncated to a less than the diameter of the fibers (which provide these ports). The vertical axis W is calibrated in waves and measured at the center of the spectrum of the input light. This spectrum may be from 1,500 to 1,600 nanometers. The center of the spectrum has a wavelength of 15;50 nanometers. The maximum number of waves at the ends of the vertical access is plus and minus 0.2 waves.

The toroidal surfaces 3 and 4 may be defined using the following equation.

$$z(x, y) = \frac{r_x^2/R_x + r_y^2/R_y}{1 + \sqrt{1 - (k_x + 1)r_x^2/R_x^2 - (k_y + 1)r_y^2/R_y^2}},$$

where z(x,y) is the surface sag, x and y are lateral distances from the optical axis 16 (x-y-S comprise a Cartesian coordinate system), $k_x$, and $k_y$ are conic constants along the x and y axes, respectfully, and $R_x$ and $R_y$ are radii of curvature constants along the x and y axes, respectively. Other expressions of a toraidal surface may be used in designing the lenses, including a more generalized polynomial expression, however, the same results is achieved. The toroidal surfaces are defined by $R_y$ and $R_x$ being different values and $k_y$ and $k_x$ being different values. These values are shown in the prescription for the embodiment of the invention illustrated in FIGS. 1 and 2 in Table I presented below.

TABLE I

| Surface # | Radius-Y (mm) | Radius-X (mm) | Conic-Y | Conic-X | Thickness (mm) | Material |
|---|---|---|---|---|---|---|
| 1-Fibers, 10, 12 | — | — | — | — | 1–2 = 0.283 | Air |
| 2 | ∞ | ∞ | | | 2–3 = 2.4 | Silica |
| 3 | −0.863 | −0.864 | −0.6704 | −0.4692 | 3–4 = 3.5 | Air |
| 4 | 0.863 | 0.864 | −0.6704 | −0.4692 | 5–5 = 0.283 | Silica |
| 5 | ∞ | ∞ | | | 5–6 = 0.283 | Air |
| 6-Fiber 14 | — | — | — | — | | |

Optical performance of the system defined by the prescription of Table I is presented in Table II.

TABLE II

| Fiber Separation, S (um) | P-V Wavefront Error (waves) | RMS Wavefront Error (waves) | Strehl Ratio | Estimated Insertion Loss (dB) |
|---|---|---|---|---|
| 125 | 0.112 | 0.0156 | 0.995 | 0.1 |
| 240 | 0.066 | 0.0159 | 0.988 | 0.1 |

It will therefore be seen that with the conventional retractive design (apparent from FIGS. 3A and 3B and 4A and 4B) that the insertion loss is approximately 0.4dB (per lens 18 and 20); whereas with the coupler with anamorphic (toroidal) lenses in accordance with the invention, the insertion loss is approximately 0.1 dB or less depending upon the separation of the input and one of the output ports which face the same side of the coupler.

For wavelength division multiplexing, an array of couplers may be connected in cascade. The output ports at surface 1 provide successive, narrow band width channels of the broad band width optical signal at the other port on the input sides of the coupler. In the event that fewer couplers in the cascade are desirable, additional output ports having additional different narrow band wavelength channels may be provided using the embodiment shown in FIG. 7. This embodiment is similar to the embodiment of FIG. 1 except that the filter 23 has two parts or is two filters #1 and #2,as shown, one of which is tilted at a different angle to the optical axis than the other. The filter part directs a reflected beam through the lens 18 to another output port (the location of fiber #3) which may contain a different part of the spectrum of the broad band input optical signal. Thus, in FIG. 7, a 4-port system is shown. In this system the beam emanating from the fiber #1 passes through the first collimator lens 18. The first filter, filter #1, reflects a specific portion of the input spectrum. This reflected portion passes back through the first collimator 18 and enters fiber #2. The unreflected portion of the beam propagates to the second filter, filter #2, at which point another specific portion of the input spectrum is reflected. This reflected portion passes back through the first filter and the first collimator and enters fiber #3. Since filter #2 is tipped slightly relative to filter #1, the beam is steered to fiber 3#. The unreflected portion of the beam passing through the filter #2 enters lens #2 and is focused onto output fiber #3.

From the foregoing description it will be apparent there has been provided an improved optical coupling system, especially adapted for use as a fiber optic coupler. Variations and modifications in the herein described system, within the scope of the invention, will undoubtedly present themselves to those skilled in this art. Accordingly, the foregoing description should be taken as illustrative and not in a limiting sense.

I claim:

1. A system for coupling light from an input port to a plurality of output ports comprising a pair of lenses which are arranged in collimating and decollimating relationship to provide light paths from said input port to said output ports, an element between said lenses via which light collimated by one of said pair of lenses passes and which divides said light into a plurality of paths to said output ports, and at least one of said lenses having a rotationally asymmetric surface providing correction of aberration of said light which passes along said path.

2. The system according to claim 1 wherein said rotationally asymmetric surface is a toroidal surface.

3. The system according to claim 2 wherein both of said pair of lenses have said aberration correcting toroidal surfaces.

4. The system according to claim 3 wherein said lenses are disposed in cascade along a common optical axis and said ports are spaced radially from said axis.

5. The system according to claim 4 wherein said input port and at least one output port faces the collimating one of said lenses and the other of said output port faces the decollimating one of said lenses.

6. The system according to claim 5 wherein said input port and said at least one output port are spaced radially from said output axis at approximately equal distances therefrom.

7. The system according to claim 6 wherein said input port and at least one output port are spaced diametrically opposite to each other at said approximately equal distances from said axis.

8. The system according to claim 1 wherein said element is a band splitting filter having broad band transmission and narrow band reflection or narrow band transmission and broad band reflection.

9. The system according to claim 8 wherein said filter is an interference filter.

10. The system according to claim 1 wherein said element is a filter having a plurality of surfaces and which transmits along one of said paths and reflects along at least one other of said paths.

11. The system according to claim 10 wherein said surfaces include at least one surface, which is disposed at a different angle than another of said surfaces, to an optical axis along which said lenses are disposed so as to provide a plurality of ports, which exceed two in number, facing one of said lenses.

12. The system according to claim 8 wherein said filter provides said optical paths which extend to a number of ports exceeding two in number which are disposed facing one of said lenses.

13. The system according to claim 12 wherein said filter comprises a pair of wave length selective interference filters one of which having the surface tilted with respect to a surface of the other of said filters thereby providing reflection from said input port to a plurality of output ports facing the collimating one of said lenses.

14. The system according to claim 2 wherein said toroidal surface is defined by the following equation.

$$z(x, y) = \frac{r_x^2/R_x + r_y^2/R_y}{1 + \sqrt{1 - (k_x + 1)r_x^2/R_x^2 - (k_y + 1)r_y^2/R_y^2}},$$

where z(x,y) is the surface sag, x and y are lateral distances from the optical axis, (x-y-z comprise a Cartesian coordinate system),$R_x$, and $R_y$ are radii of curvature constants along the x and y axes, respectively and where $R_y$ and $R_x$ are of different value and $k_2$ and $k_x$ also have different values.

15. The system according to claim 1 wherein said collimating lens and said decollimating lenses are plano convex lenses having convex surfaces which are toroidal surfaces.

16. The system according to claim 1 wherein said ports are ends of optical fibers.

17. The system according to claim 16 wherein said lenses are constituted of the same material as said optical fibers so as to enable said optical fibers to be attached to said lenses without introducing reflection at the interface between said fiber ends and said lenses said attachment being selected to the group consisting of attachments including plastic resin, adhesive glue and fusion bonding.

* * * * *